2,308,483

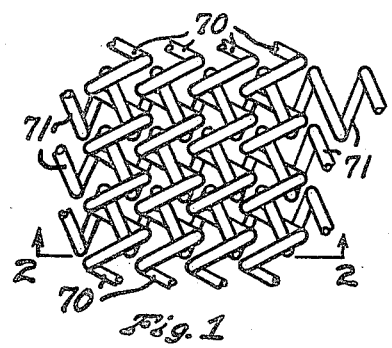
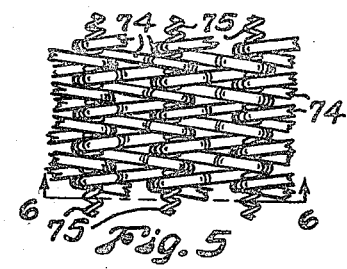
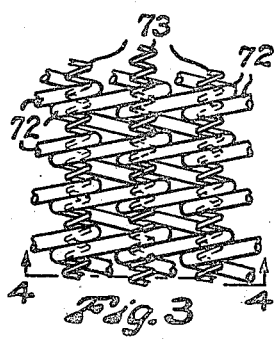
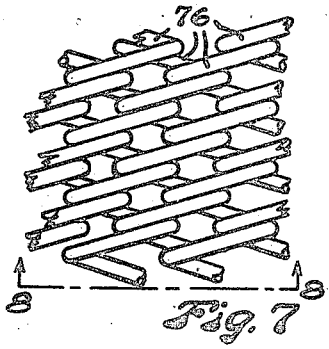
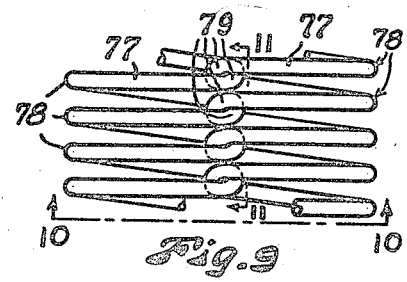
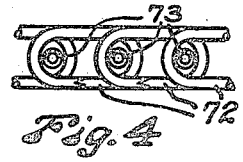
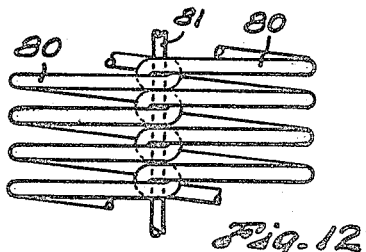
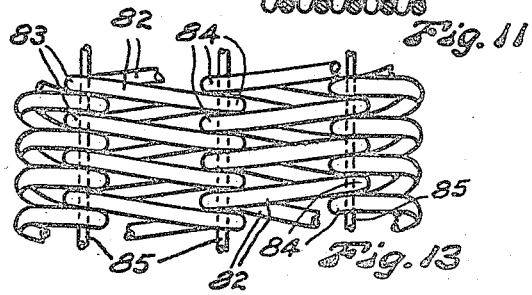
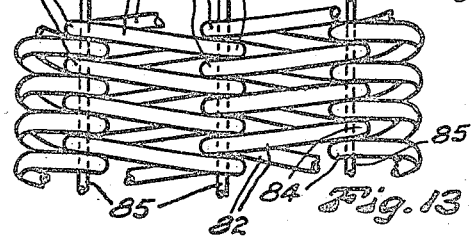

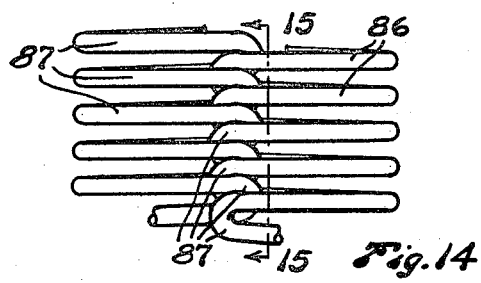
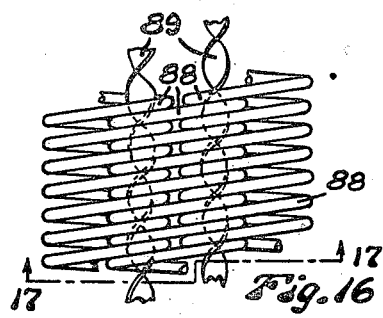
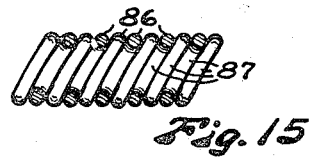
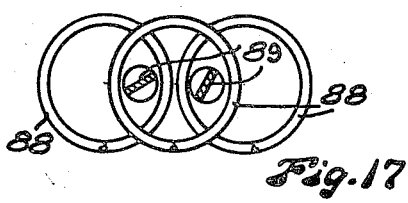
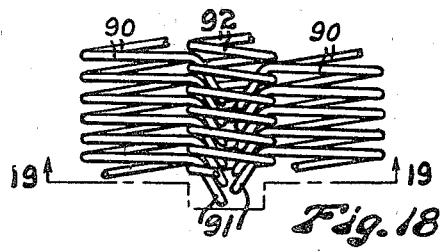
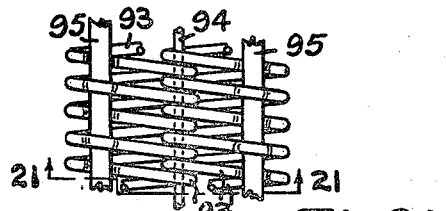
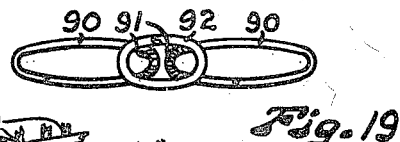
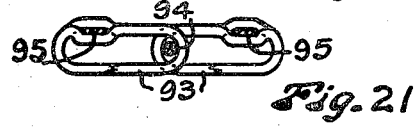
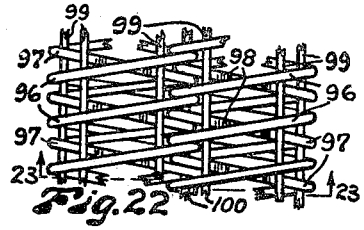
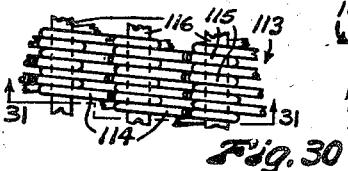
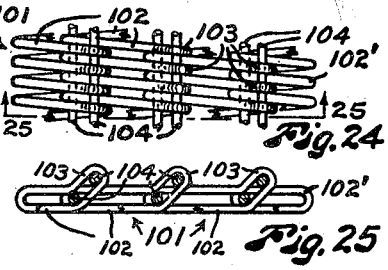
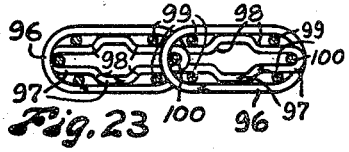
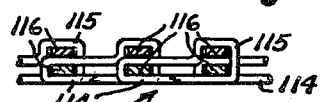
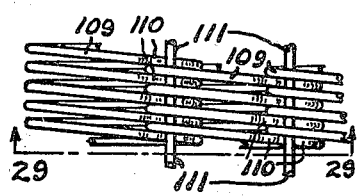
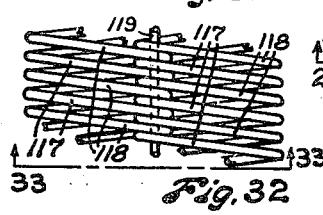
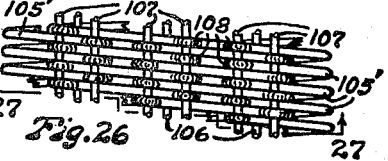
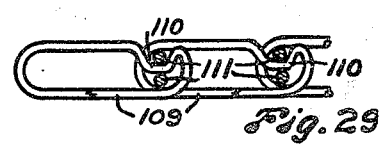
INVENTOR.
Roger Anderson
BY
ATTORNEY Patented Jan. 19, 1943

UNITED STATES PATENT OFFICE 2,308,483

METHOD OF FORMING A DEVICE FROM A PLURALITY OF PLASTIC MEMBERS, THE PRODUCT THEREOF, AND A PREPARED MATERIAL FOR USE THEREIN

Roger Anderson, Seattle, Wash.

Application January 24, 1940, Serial No. 315,390

23 Claims. (Cl. 128—90)

This invention relates to a structural supporting-covering means formed from a plurality of members having a multiplicity of contacting portions and means adhering the members together at such contacting portions. This invention also contemplates a material ready for application comprising a multiplicity of flexibly joined together plastic members forming a strip permitting contacting members to be adhered together at their contacting portions.

More particularly this invention relates to a truss-like supporting member particularly applicable to the surgical and medical field for use as a cast. In describing this invention in connection with this field of utility, it is to be understood that the invention is not limited to such field but is coextensive to all fields where like problems exist in whole or in part.

This invention includes a method of preparing a device, such as a cast member; a prepared material ready for application, such as a cast material; and the completed device, such as the completed cast.

Medical and surgical casts primarily have for their purpose (a) fixation and (b) to sustain traction or pull and counter-traction or counter-pull. For example, where a bone has been fractured, it is necessary that the broken parts be held in the desired position to permit healing. A cast is placed over the flesh about the bone and indirectly holds the bones in the desired position—indirect in that the cast must act through the flesh in providing the desired position of the bone.

A primary object of this invention is to provide a cast material which may be applied to follow uniformly the variations in the flesh so that the cast will conform to the body. This is particularly necessary, for if the pressure is not uniformly distributed over a substantial area, soreness in particular spots will result, or if the pressure is so great as to close off blood vessels, then gangrenous conditions will result. Local pressure sores of gangrenous conditions resulting from pressure are not at all uncommon in casts heretofore used. Heretofore plaster of Paris casts were the type of casts generally employed in maintaining reduced or set fractures. While these plaster of Paris casts were of different forms, they generally comprised thin layers of gauze or the like disposed between layers of plaster of Paris.

In orthopedic surgery, generally it is necessary to place the patient under an anaesthetic during the time of the bone operation or fracture reduction, to apply the cast and then to keep the patient under the anaesthetic until the cast has sufficiently set to prevent displacement of the fracture.

While it has been long known that there are many shortcomings in the commonly used plaster of Paris casts, still no one has heretofore devised a cast which has been satisfactory and will overcome these recognized shortcomings.

It is an object of my invention to provide a cast member which will set and dry rapidly and thus reduce the relatively long anaesthetic period heretofore required where the standard plaster of Paris casts were used. While plaster of Paris cast-forming material may be obtained having longer and shorter setting periods, this does not solve the problem. The setting period of the plaster of Paris employed must be determined by the size of the cast. One layer after another of the plaster of Paris is applied and there should be no setting of the first layers until the latter layers are applied. In view of the fact that a chemical change takes place with the setting of plaster of Paris, the application of a second layer over a previously set layer would cause a weakening of the first set layer. Furthermore, if the first layer were set before the second layer were applied, there would be little, if any, adhesion between the two layers. Where a spica cast is applied, that is, about the body and one limb, or a double spica cast, that is, about the body and two limbs, a very substantial and thick cast structure is provided. To apply a spica or double spica plaster of Paris cast will obviously require considerable periods of time, and if a proper cast of sufficient strength is to be provided, obviously a slow-setting cast material must be employed or else the various layers of the cast will not be properly adhered together in a unitary cast structure. The use of a cast material, having a setting period so that the first bandages have not set before the later ones have been applied, obviously means that a long period of time must result after the cast has been applied before the same is set. Under such circumstances a relatively long anaesthetic period is required even though it is readily conceded that long anaesthetic periods have very undesirable effects on patients.

It is an object of my invetnion to provide a cast which is very transparent to the rays from X-ray and fluoroscope devices so that the condition of the fracture may be ascertained at all times. The plaster of Paris casts heretofore used are relatively dense to the rays of an X-ray or fluoroscope device and more dense when wet so that the attending physician could not positively ascertain conditions existing around a fracture.

If the attending orthopedic surgeon is able to use a fluoroscope at the time of reducing the fracture and applying the cast, very substantial increase in the precision of the operation is effected. In this connection it must be remembered that some portions of the body, as the hips, are normally considerably dense to the rays of a fluoroscope and any increase in this density, such as by wet plaster of Paris, will eliminate the possibility of use of the fluoroscope in fracture cases involving such dense parts of the anatomy.

It is a further object of my invention to provide a cast which is transparent or of an open mesh-like structure so that the attending physician will be able to ascertain existing skin conditions under the cast. Where an ordinary plaster of Paris cast is used, the attending physician is unable to ascertain the condition of the skin and is therefore not warned that gangrenous conditions by reason of pressure are impending. Obviously, all of the complaints of patients cannot be properly evaluated, as the normal reactions following an injury are not uniform. On the other hand, if the attending physician examines the skin as to color, etc., he will be in a position to more accurately diagnose existing conditions and to evaluate the complaints of patients.

It is an object of my invention to provide a cast member which may be reconstructed or repaired as conditions require so that it will be form fitting throughout the life of its use. After a cast is applied, it is common, especially when a cast is applied shortly after an injury, for swelling to occur to the injured member. Thus where a fresh fracture is involved it is frequently advisable to split the cast lengthwise so as not to cause undue pressure as the tissues around the fracture swell. Of course if the pressure were not relieved by splitting the cast, there is always the likelihood of subsequent gangrenous conditions. Also after the swelling normally inhering in a fresh fracture has been reduced, there is a further shrinkage due to the fact that the cast causes the flesh to be immobile and results in muscle atrophy and shrinkage of the soft tissues. Thus a cast which properly fits at the time of application often becomes too big because of muscle atrophy and shrinkage.

The unit cast structure of the plaster of Paris cast is of importance in determining the strength of the cast. If it is necessary to split a plaster of Paris cast to obtain a proper fit, the strength of the cast is materially decreased by reason of the splitting. At the present time bulky reinforcements are employed in an effort to avoid the weaknesses caused by splitting of the cast. However, such bulky reinforcements generally do not accomplish the purpose of providing the original strength.

It is desirable that a cast be form-fitting throughout the life of its use even though the member under the cast may change size considerably due to swelling or reduction of swelling. With plaster of Paris casts a chemical action takes place with the setting thereof, and subsequent wetting of the cast does not serve to soften the cast so that it may be rehardened, but serves to crumble or wash away the set material. It has thus been long recognized that plaster of Paris casts have an inherent disadvantage so far as form-fitting throughout the life of their use, and this has been a matter of great concern to the attending physician.

It is an object of my invention to provide a cast formed from a plastic material which material will provide a cast that is non-toxic. Further it is an object to provide a cast from a plastic material which is non-absorbent. Present plaster of Paris casts are absorbent and it is not uncommon, particularly with elderly persons, for casts to become exceedingly contaminated by body eliminations or body sweat with resulting odors.

It is an object of my invention to provide a cast made from plastic material which may be re-used and therefore has scrap value.

It is an object of this invention to provide a cast member which may be applied in the surgeon's office or other place where convenient. In the prior art plaster of Paris casts, due to the powdery conditions of the loose plaster of Paris and the extremely untidy operation involved in applying a plaster of Paris cast, the use of such casts in offices or other places away from an operating room has been extremely limited. In applying a plaster of Paris cast, the plaster of Paris bandages must be applied wet and drip out white material, so that a special room, as the operating room, is used and, in practical effect, the application often results in an appearance much like the plastering of a house.

It is an object of my invention to provide a cast which is characterized by being free from moisture at the time of application, thus eliminating the relatively long drying-out period following the setting period existing in plaster of Paris casts. After a plaster of Paris cast sets sufficiently so that it will secure the fracture in the desired position, still there are very substantial portions of water present which must be removed as by evaporation. With a body cast it takes from 24 to 48 hours, or even longer, for the moisture to dry out of the cast. It is not uncommon for many complications to follow because of such moisture and long drying out period where large casts, as body casts, spica or double spicas, are involved. These complications include pneumonia. With the evaporation of moisture from the cast a cooling or lowering of temperature may be expected. On the other hand, it is the accepted method of treatment to combat shock following a major operation to apply heat and any cooling is undesirable. Obviously, it is difficult to have applied heat reach the patient through the insulation of a wet heavy plaster of Paris cast.

It is an object of my invention to provide a cast member which will permit therapy, including hydrotherapy, treatments without adversely affecting the cast member. The skin continually grows and there is a sloughing off of old skin and a constant secretion by the body pores. When it is necessary to confine a patient within a plaster of Paris cast for a relatively long period, this secretion and sloughed-off skin accumulate, causing undesirable odors and irritation of the skin. Oftentimes it is necessary to provide electrical, light, chemical, or drug therapy to the skin. Such treatment is obviously impossible with present-day plaster of Paris casts and at times it is necessary to remove a cast merely to provide some of the above treatments and then to provide a new cast. Many times, while the therapy treatment may be essential to combat certain complications, still this may not be done without seriously hazarding the fracture by removing the cast.

It is, therefore, an object of this invention to provide a cast member which is unaffected by moisture, which moisture may be present by reason of hydrotherapy treatments, moisture from the air or moisture secretion from the patient. In this connection it is important to note that casts are used in many cases which are not fracture cases but for cases as sprains, swollen tender joints, arthritis, holding extremities, body or head, in corrected positions, club feet, and following certain plastic operations, such as for skin, tendons, nerves, blood vessels, muscles and joint conditions. In these cases it may be advisable to provide the patent with various types of therapy, water therapy in special exercise tanks, and baths.

It is an object of this invention to provide a cast which is characterized by having its full strength shortly after the cast is applied. In the prior art plaster of Paris casts, the casts were somewhat weak until the plaster of Paris had completely set and completely dried, the period of complete drying requiring often from twenty-four to forty-eight hours depending on the bulk of the cast. Many times, plaster of Paris casts have been broken during the drying period in providing the routine care to patents as by nurses.

It is an object of this invention to provide a cast which is relatively light in weight. In the prior art plaster of Paris casts, double spica plaster of Paris casts often weight as much as twenty pounds, thus increasing the weight of the patient and enhancing the problem of the nurse in moving the patient as well as enhancing the problem of the patient moving where otherwise able. In this connection I provide a cast which will weigh one-third or less than the weight generally necessary in plaster of Paris casts.

It is an object of my invention to provide a cast-forming material, which cast-forming material may be provided in strips or sheets comprised of a plurality of contacting members so that the strips may be applied in contacting relation about an injured member or part and then the members adhered together at their contacting portions.

It is an object of my invention to provide a cast which will be closely conforming and give comfortable feeling to the patient, and near appearing.

It is an object of my invention to provide a cast which has a certain degree of resiliency to the end of eliminating the fracturing and chipping heretofore resulting when plaster of Paris casts were in use.

It is an object of my invention to provide a cast which may be readily and rapidly cut so as to permit the same to conform to the body to eliminate pressure sores and at the same time to permit the cast to be immediately and rapidly repaired without loss of strength. In this connection I provide a cast where there is proper annealing, fusing or cementing action between the cast and any additional cast material of like nature which may be applied thereto.

It is a further object of my invention to provide a cast material which may be applied with more latitude allowed in technique. Contrary to prevailing opinion, it takes considerable skill and experience to properly apply a plaster of Paris cast. The bandage containing the plaster of Paris must be lapped around many times and the base of this plaster of Paris bandage is ordinary cotton bandage which has a tendency to fold and cause creases unless properly applied. Creases, if present, generally cause local skin sores, undue pressure, complications and pain. It is an object of my invention to provide a cast-forming material which may be applied with the exercise of less skill or more latitude in technique and at the same time to provide a closely conforming well-fitting cast.

It is an object of my invention to provide a cast which may be easily and readily removed when desired. In the prior art many casts have a thickness up to an inch and a half, which thickness is provided by a number of layers of cloth and a number of layers of hardened or set plaster of Paris. It is obviously a very difficult task to remove such a cast. Generally the cast is cut away by knives and it is really a task for a chisel and a hammer. On the other hand, I provide a cast which may be chemically softened or cut away by an ordinary pair of shears.

It is an object of my invention to provide in dry form a plurality of members of material which will form a truss-like structure, with the members and portions of a member in contacting relation so that they may be adhered, cemented or welded together to form a unit cast structure. It is a further object of my invention to form a mesh-like structure so that visibility and accessibility to the skin of the patient is not eliminated by the presence of the cast structure. It is a further object of my invention to provide a cast-forming material in a form so that there is no deterioration of the same by exposure to air or weather prior to use. This provides for utmost economy in that the portion of the material desired for use may be removed from a sterile container and the remainder saved for subsequent use.

It is an object of my invention to provide a cast-forming material which is particularly useful where extension types of casts are to be used. In an extension type of cast, two separate casts are formed with a space therebetween, then the proper extension is made and a cast is provided between the two separate members. The prior art plaster of Paris casts required an extremely bulky cast to obtain the desired strength in such type of casts. As distinguished therefrom, my invention provides an extension type of cast with little difficulty and no more bulk than the ordinary cast of my invention.

Materials

Many materials may be used in this invention and preferably cellulose plastics are used, as: cellulose acetate, cellulose nitrate, use may also be made of vinyl resins, Celluloid, and similar substances. Also the plastic material may be transparent or suitably colored if desired.

*Adhesives or liquids to be used in adhering, welding or securing the pieces of material together*

Typical liquids which bring the desired action are:

Acetone
sec-Butyl alcohol
Carbon disulfide
Ethyl alcohol
Methyl acetone
n-Amyl acetate
m-Amyl alcohol
"Cellosolve" acetate
Diethyl "Cellosolve"
Isobutyl acetate
"Carbitol" acetate
Benzyl "Cellosolve"
Acetylene dichloride
n-Butylamine
Ethyl acetate
Methyl acetate
Methyl ethyl ketone
Amyl acetate (mixed isomers)
"Cellosolve"
Methyl amyl acetate
Methyl "Cellosolve" acetate

Forms

The materials may be employed in the form of solids, coated inert solids, or hollow structures.

Structures

Typical structures which may be employed are illustrated in the following drawings, the same being preferred exemplary forms of structures for use in my invention, throughout which drawings like reference numerals indicate like parts:

Figure 1 is a fragmentary plan view of one form of structure showing one group of parallel helices and a second group of parallel helices at right angles thereto and with the helices of one group threaded through the helices of the other group;

Fig. 2 is a view partly in elevation and partly in section taken substantially on broken line 2—2 of Fig. 1;

Fig. 3 is a fragmentary plan view of another form of structure showing a plurality of parallel helices, which are flattened so that each convolution provides an oblong loop, and which helices are interfitted and are laced together by relatively small members as relatively small helices, threaded through the interfitting elongated loops;

Fig. 4 is a view partly in elevation and partly in section taken substantially on broken line 4—4 of Fig. 3;

Fig. 5 is a fragmentary plan view of another form of structure showing a plurality of double helices or parallel coils each wound as a figure 8, which coils are interfitted and laced together by relatively small helices;

Fig. 6 is a view partly in elevation and partly in section taken substantially on broken line 6—6 of Fig. 5;

Fig. 7 is a fragmentary plan view of parallel flattened helices similar to Fig. 3 except that adjoining helices are interwoven to eliminate the separate small helices shown in said Fig. 3;

Fig. 8 is a view partly in elevation and partly in section taken substantially on broken line 8—8 of Fig. 7.

Fig. 9 is a fragmentary plan view of another form of structure showing two parallel helices which are flattened or provided with oblong loops and threaded into each other, and more particularly the ends have been formed so that the outer end portions of the loops lie in parallel vertical planes;

Fig. 10 is a view partly in elevation and partly in section taken substantially on broken line 10—10 of Fig. 9;

Fig. 11 is a view partly in elevation and partly in section taken substantially on broken line 11—11 of Fig. 9;

Fig. 12 is a fragmentary plan view of a structure similar to Fig. 9, showing the use of rod-like means extending longitudinally of and through the interlocked looped portions of the two helices;

Fig. 13 is a fragmentary plan view of another form of structure showing two parallel helices which are flattened and form oblong loops, the loops of one helix have been interfitted with the loops of the other helix and rod like means have been longitudinally extended through the interfitting loops;

Fig. 14 is a fragmentary plan view of another form of structure showing two parallel flattened helices which are interfitted and held in engagement with each other by the angular position of the end portions of the adjoining loops;

Fig. 15 is a view partly in elevation and partly in section taken substantially on broken line 15—15 of Fig. 14;

Fig. 16 is a fragmentary plan view of another form of structure showing three parallel helices which are threaded into each other and with twisted bar-like members extending through adjoining loops of adjacent helices;

Fig. 17 is a view partly in elevation and partly in section taken substantially on broken line 17—17 of Fig. 16;

Fig. 18 is a fragmentary plan view of another form of structure showing two spaced-apart parallel helices which have been flattened to form loops and with the adjacent end portions of said helices bent to form hook-like members, which hook-like members are engaged within a third helix which connects the two first mentioned helices together;

Fig. 19 is a view partly in elevation and partly in section taken substantially on broken line 19—19 of Fig. 18;

Fig. 20 is a fragmentary plan view of another form of structure showing two parallel helices which have been somewhat flattened to form loops and with longitudinally extending bar like members disposed over and under alternate members to provide a contact area between said bar-like members and the loops as the structure assumes a curved position;

Fig. 21 is a view partly in elevation and partly in section taken substantially on broken line 21—21 of Fig. 20;

Fig. 22 is a fragmentary plan view of another form of structure showing two parallel flattened helices, each of which helices has a helix disposed therewithin and provided with bends so that rod like members may be extended longitudinally of the helices; the two parallel helices and the helices within each thereof are shown connected together by a longitudinally extending rod member;

Fig. 23 is a view partly in elevation and partly in section taken substantially on broken line 23—23 of Fig. 22;

Fig. 24 is a fragmentary plan view of another form of structure showing two flattened parallel helices and with the convolutions of each helix forming substantially an L shape and which helices are interconnected as by longitudinally extending rod like members;

Fig. 25 is a view partly in elevation and partly in section taken substantially on broken line 25—25 of Fig. 24;

Fig. 26 is a fragmentary plan view of another form of structure showing a device somewhat similar in function to that of Figs. 24 and 25 except the convolutions of each helix are of trough-like shape;

Fig. 27 is a view partly in elevation and partly in section taken substantially on broken line 27—27 of Fig. 26;

Fig. 28 is a fragmentary plan view of another form of structure showing parallel flattened helices, one end portion of the loops of each helix being deformed so that two longitudinal rod like members may be passed to secure adjacent helices together;

Fig. 29 is a view partly in elevation and partly in section taken substantially on broken line 29—29 of Fig. 28;

Fig. 30 is a fragmentary plan view of another form of structure somewhat similar to Figs. 24 and 25 except that the helices are deformed to receive longitudinally extending flattened bars instead of rod like members;

Fig. 31 is a view partly in elevation and partly in section taken substantially on broken line 31—31 of Fig. 30;

Fig. 32 is a fragmentary plan view of another form of structure which is somewhat similar to Figs. 22 and 23, showing two interthreaded helices, one of which is flattened a greater amount than the other, and which two helices are connected by longitudinally extending members with similar helices;

Fig. 33 is a view partly in elevation and partly in section taken substantially on broken line 33—33 of Fig. 32;

In the foregoing Figs. 1 to 33 inclusive, I have shown structures which may be used in this invention, which are characterized by forming a mesh-like trussed structure. In these figures, a plurality of contacts are formed between helices, which contacts are in different planes so that upon adherence of the material at these contacting points a truss-like open mesh structure is formed. While the structures are not true helices, this term as used in the specification and claims is to be construed in view of the disclosure.

Referring more particularly to Figs. 1 and 2, a plurality of parallel helices 70 are provided, and a second group of parallel helices 71, positioned at right angles to the helices 70, are turned to engage with said helices 70 or threaded thereinto. The mesh-like structure so provided is positioned so as to form a cast member and then the adhesive applied. If the helices 70 and 71 have been formed of a material such as a cellulose acetate, then a liquid such as acetone may be applied as by spraying. Due to the fact that the material in the helices 70 and 71 has a relatively substantial body, considerable latitude obtains in the amount of acetone which may be used. Of course if the acetone substantially dissolved the cellulose acetate, a very slow drying would result. However, I have found that by spraying the structure with acetone very little acetone need be employed, and due to the body of the material and the open mesh-like structure, excess, if any, acetone will be eliminated so that a rapid setting obtains.

In Figs. 3 and 4 the parallel helices 72 have been either formed with oblong loops or have been formed round and then flattened. These helices 72 are interfitted and then laced together by a member extending longitudinally thereof. The longitudinally extending member may include any of the longitudinal members hereafter described, and in Figs. 3 and 4 the longitudinally extending members are shown as helices 73. The material used in forming the flattened helices 72 or other helices hereafter described which have been flattened or otherwise bent, is preferably first heated until it becomes plastic or moldable sufficient only so that it may be used to form rod like members. The rod like members thus formed may be immediately used and the helices formed on a form in a lathe. Also, of course, the material could be formed as rod like members and then reheated by a fluid until it become sufficiently moldable so that coils or helices could be formed. Also, if a true helix were formed, the material could be reheated by a fluid and then flattened or any other configuration readily formed.

In Figs. 5 and 6 I have shown parallel coils 74, each coil formed as a figure 8. I have thus shown a modification where more than one loop is provided for each coil. Preferably I find that each coil need not have more than two loops, thus forming a figure 8. Two parallel loops 74 are interfitted and laced together by a longitudinally extending member as relatively small helix 75.

In Figs. 7 and 8, I have shown a plurality of flattened helices 76 which are similar to the helices 72 of Fig. 3. Instead of interfitting the helices in Fig. 7 and then lacing them together by longitudinally extending members, I have shown the helices 76 of Fig. 7 threaded together.

In Figs. 9, 10 and 11, I have shown two parallel and flattened helices 77 which have been formed or modified after forming so that the outer end portions 78 of each loop lie in parallel vertical planes. As shown in said figures, the outer end portions 78 lie in substantially vertical planes and sufficient bending is provided at the contacting inner end portions 79 to compensate for the pitch in the helices 77. In this connection see particularly Fig. 11.

In Fig. 12, I have shown parallel helices 80 which are similar to the helices 77 of Fig. 9. However, in Fig. 12 I have shown a longitudinally extending member 81 used to lace the helices 80 together. An alternative type of longitudinally extending member is shown where a rod like member 81 is illustrated. This rod like member 81 may obviously be used in place of the other longitudinally extending members herein described, or such other longitudinal members herein described may be used in place of said rod like member 81.

In instances where rod like members are used in the various structures hereinbefore or hereinafter described, the rod like members should be of sufficient length over the length of the helices so as to allow for the extra length needed where the strip is wrapped over a member of increasing diameter, such as the calf of a leg, or where rod like members are axially positioned at different diameters about a member.

In Fig. 13, I have shown a plurality of parallel helices 82 which have been flattened to form oblong loops. The loops are similar to the loops of Figs. 9, 10 and 11 or of Fig. 12 except that both end portions 83 and 84 have been somewhat twisted so as to provide better interfitting between the helices 82. After the helices 82 have been interfitted, longitudinally extending means as rod like members 85 serve to lace the helices 83 together.

In Figs. 14 and 15, I have shown two parallel helices 86 where the end portions 87 have been bent either upwardly or downwardly so that they will interfit and are held in engagement by the angular position of the end portions 87.

In Figs. 16 and 17, I have shown a plurality of helices 88 which are interfitted and/or interlaced and may follow the form of any of the helices or loops herein described. The particular change involved in the structure of Figs. 16 and 17 resides in the twisted bar-like longitudinally extending members 89. These twisted bar-like members 89 are threaded through overlapping adjacent loops of helices 88.

In Figs. 18 and 19, I have shown two spaced-apart parallel helices 90 which have their adjacent end portions 91 bent in a longitudinal direction to form hook-like members. These hook-like members or end portions 91 are woven into or positioned between loops of a third helix 92. In this way the helices 90 and 92 are detachably secured together for rapid engagement or disengagement.

In Figs. 20 and 21, I have shown parallel helices 93 which are secured together in any of the herein described manners, as by rod-like member 94. Rod or bar-like members 95 are shown as extending over and under alternate loops of the helices 93. The purpose of the rod-like member or bar-like members 95 is to provide additional contacting areas as the member is positioned about an arcuate surface, as about a limb, when used for a cast.

In Figs. 22 and 23, I have shown parallel helices 96, each of which has positioned therewithin a helix 97. The helix 97 is formed with bent portions 98 to permit rod-like members 99 to be threaded and held between the helices 96 and 97. Each pair of helices 96 and 97 may be secured to an adjacent pair by any of the means described, as by rod-like members 100.

In Figs. 24 and 25, I have shown parallel helices 101. Each loop is provided with a portion 102 and a portion 103 angularly positioned thereto, thus forming substantially an L shape. Rod-like members 104 extend longitudinally of each helix 101 so that said rod-like members 104 may be threaded thereinto. The rod-like members 104 will provide for a number of contact areas as the structure is fitted about an arcuate surface. Preferably the marginal portions 102 and 102' are similar so that they will interfit when the strip is wound about a limb.

In Figs. 26 and 27, I have shown a structure similar in function to the structure shown in Figs. 24 and 25. Parallel helices 105 are connected together as by longitudinal rod-like members 106. Each loop has an oblique portion 107 at each end, thus providing a trough-like shape. The rod-like members 108 extend through the oblique portions 107 and provide numerous contact areas and aid in securing the helices 105 together. The marginal portions 105' are similar for the same purpose as 102 and 102' of Figs. 24 and 25.

In Figs. 28 and 29, I have shown helices 109 so designed as to provide deformed portions 110 at corresponding edges. Rod-like members 111 extend over and under the deformed portions 110 and function to provide extended contact areas and to secure the helices 109 together.

In Figs. 30 and 31 helices 113 are provided with flattened portions 114 and raised portions 115. A flattened portion 114 is interfitted with a raised portion 115 of an adjacent helix and bar-like members 116 are passed through the interfitted helices and function to provide extended contact areas and to secure the helices 113 together.

In Figs. 32 and 33, I have shown larger flattened helices 117 and smaller flattened helices 118. A helix 117 is interthreaded with a helix 118 and each pair so former is interfitted with an adjacent pair and connected therewith by longitudinally extending members 119.

The structure shown in Figs. 20 to 33, inclusive, has been designed so that the openings for the various rod like members will provide a relatively close and contacting fit between the rod like members or bar like members and the various helices. This will provide for positive contacting areas as the members are applied to an arcuate surface.

The various mesh-like structures provided in Figs. 1 to 33, inclusive, may be formed as strips. Then the strips may be applied spirally about an injured member. Each lap about the injured member will preferably contact with its adjacent lap. One or more layers of a particular strip or one layer of one particular strip and a layer of another strip may be employed. After the cast structure has been thus applied, the liquid adhesive is applied, as by spraying or other manner hereinafter described. Any inadvertent excess adhesive will be rapidly eliminated because of the structure involved and the various discrete pieces of material will be adhered together at the contacting portions and a mesh-like trussed structure will be formed. The trussed structure so formed has been found to have great strength so that relatively thin cast members so formed will have a strength equal to that of a plaster of Paris cast having a plurality of times greater thickness and weight.

The members employed in my invention may take various shapes or configurations as illustrated in the previously described drawings. The materials from which these members may be formed, as well as adhesives which may be employed, have also been described. The surface of the material used is preferably non-porous in character so that any excess adhesive used will be readily removed instead of tending to completely dissolve the material.

In applying a cast in accordance with this invention, it may be advisable to first apply a cloth about the injured member. If it is found desirable to apply such a cloth, preferably a cloth formed of spun glass is used, as such cloth is inert to body perspiration. Either over such cloth or directly over the injured member, the pieces or particles of the material are applied to form a plurality of contacting members having numerous or a plurality of contacting areas. The strips comprising a plurality of members may be applied in a dry state and then sufficient adhesive sprayed or otherwise applied. Excess adhesive will be readily removed and a quick-setting cast formed. In addition to spraying the adhesive, it may be applied as by dipping the members or it may be applied by a brush.

Also, preferably, the members are of a substantial cross-section area such as at least $\frac{1}{32}$ of an inch. It seems that where relatively large members are used excess adhesive will evaporate and/or migrate inwardly of the members without dissolving the same, thus removing excess adhesive and permitting considerable latitude in the amount of adhesive which may be applied. This means that I have removed any necessity for the application of a critical amount of adhesive, which compensates for the individual variations in technique.

The fact that excess adhesive is removed by drainage and/or evaporation and/or by migration inwardly of the members is important in this invention. For example, if a powdered material were mixed with an adhesive to form a dough-like mass, this dough-like mass would take a substantially long period of time to set.

The contacting plastic members may be adhered together by adhesives which are applied by a brush or a spray. If applied by a spray, the liquid may be heated and applied as a heated vapor. Also a strip may be immersed or dipped in the liquid before application. In such cases, it may be advisable to apply a thus wetted layer adjacent one or between two dry layers. Also where relatively small members of plastic material are employed and the same are dipped before application, the excess liquid may be removed physically as by wringer means.

As an alternative means of adhering together at their contacting portions any of the various shaped plastic members previously described, the plastic members may be formed on or in contact with a metallic material or pieces thereof. For example, in Figs. 3 and 4, the parallel helices 72 and the longitudinal helices 73 may be formed with a metallic core or the longitudinal helices 73 may consist of a metallic material. Thereafter the plastic material may be heated by said metallic member being placed in inductive relation to a primary field and a temperature in the plastic members attained which will cause the plastic members to become sufficiently fluid to cause adherence between the plastic members at their contacting portions.

A further alternative means of adhering together at their contacting portions any of the various shaped plastic members previously described may be accomplished by providing alternate members with a dried adhesive thereon, much like the adhesive on a postage stamp, and thereafter wetting the structure to cause adherence between members at their contacting portions. In this connection I prefer to use "water-proof" animal glue or glue having similar water-proof characteristics. In such instances the members forming the framework may be of any suitable plastic as previously described or plastics which will not be dissolved or softened by the adhesive, such as phenol condensates.

Also a framework may be provided about an injured member by the use of any of the previously described structures and thereafter tape means applied about such framework. In this instance the adhesive material may be carried by either the framework or the applied tape. In this respect I have found that Scotch tape or ordinary medical adhesive tape may be utilized.

Many of the advantages of this invention may be utilized if an open mesh structure is formed, in accordance with any of Fig. 1 to 33 inclusive, and thereafter a plastic material as plaster of Paris is applied to such open mesh work. Such structure may be likened to the screen or metal type of lathe which is used in building construction and over and into which the plaster of a wall is applied. In view of the fact that the mesh-like structure is applied dry and is completed then a quick setting plaster of Paris may be applied. One type of plaster of Paris which has been found to have the desired quick setting characteristic is that grade known on the market as "dental" grade. Also, due to the open mesh-like structure, pellets or balls or pieces of dry plaster of Paris may be incorporated into the open mesh-like structure and thereafter the material applied dry. Upon moistening the plaster of Paris included within the mesh-like structure will be caused to assume a fluid character and will thereafter set.

The term "helix" or "helices" as used herein and in the claims is used to include not only true helices as shown in Figs. 1, 2, 16 and 17, but the flattened and somewhat distorted helices shown in the other figures.

Casts embodying my invention set with such phenomenal rapidity that the period of time which the patient must be kept under an anaesthetic will be greatly reduced over any type of cast heretofore known. Furthermore, casts embodying my invention may be made to conform to the exterior surface of an injured member and such conformity may be maintained throughout the use of the cast. Also the under surface, or the surface contacting the skin, of my cast is such that movement of the skin relative to the cast is possible. This results from the fact that the cast does not provide a continuous contacting area but provides spaces between the contacting areas. By permitting movement of the skin relative to the cast, very substantial medical values result. My invention thus provides a prepared material ready for application, as a cast material which may be sold to orthopedic surgeons in strip-form; my invention provides, also, the device which is made up from such prepared material, as the cast which is made up by applying the prepared material about any injured member; and my invention covers the method of applying the prepared material to form a device, as such a cast.

Obviously, changes may be made in the forms, dimensions and arrangements of the parts of my invention without departing from the principle thereof.

I claim:

1. A surgical cast or splint material ready for application, comprising a plurality of relatively small interconnected helices of a plastic material, forming a strip, and having a multiplicity of contacting portions, whereby the contacting helices may be provided about an injured member with the helices contacting and there adhered to form a unitary structure.

2. A surgical cast or splint material ready for application, comprising a plurality of relatively small parallel threadedly interconnected helices of a plastic material forming a strip and having a multiplicity of contacting portions, whereby the contacting helices may be provided about an injured member with the helices contacting and there adhered to form a cast.

3. A surgical cast or splint material ready for application, comprising a plurality of relatively small parallel interfitted helices of a plastic material forming a strip and having a multiplicity of contacting portions; and members of plastic material interconnecting and extending longitudinally of said interfitting helices, whereby the contacting helices may be provided about an injured member with the helices and the longitudinally extending members contacting and there adhered to form a cast.

4. A surgical cast or splint material ready for application, comprising a plurality of relatively small parallel interfitted helices of a plastic material forming a strip and having a multiplicity of contacting portions; and longitudinally extending helical members of plastic material interconnecting said interfitting helices, whereby the contacting helices may be provided about an injured member with the helices contacting and there adhered to form a cast.

5. A surgical cast or splint material ready for application, comprising a plurality of relatively small parallel interconnected helices of a cellulose plastic material forming a strip and having a multiplicity of contacting portions, whereby the contacting helices may be provided about an injured member with the helices contacting and there adhered to form a cast.

6. A surgical cast or splint material ready for application comprising a plurality of relatively small, interconnected helices of a plastic material having a minimum cross section of material of about one-thirty second of an inch, whereby the helices may be applied to an injured member in superposed layers with the pieces contacting and there adhered to form a unitary structure.

7. A surgical cast or splint comprising a plurality of relatively small interconnected helices of a plastic material having a multiplicity of contacting portions and adhered together at their contacting portions thereby forming a unitary structure.

8. A surgical cast or splint comprising a plurality of relatively small parallel threadedly interconnected helices of a plastic material having a multiplicity of contacting portions and adhered together at their contacting portions thereby forming a unitary structure.

9. A surgical cast or splint comprising a plurality of relatively small parallel interfitted helices of a plastic material having a multiplicity of contacting portions and provided with longitudinally extending members of plastic material interconnecting the same and with the helices and the longitudinally extending members adhered together at their contacting portions thereby forming a unitary structure.

10. A surgical cast or splint comprising a plurality of relatively small parallel interfitted helices of a plastic material having a multiplicity of contacting portions and provided with longitudinally extending helical members of plastic material interconnecting the same and with the helices and the longitudinally extending members adhered together at their contacting portions thereby forming a unitary structure.

11. A surgical cast or splint comprising a plurality of relatively small parallel interconnected helices of a cellulose plastic material having a multiplicity of contacting portions and adhered together at their contacting portions thereby forming a unitary structure.

12. A surgical cast or splint comprising a plurality of relatively small interconnected helices of a plastic material, having a minimum cross section of material of about one-thirty second of an inch, adhered together at their contacting portions to form a unitary structure.

13. The method of forming a surgical cast or splint comprising providing a plurality of relatively small interconnected helices of a plastic material having a multiplicity of contacting portions; applying about an injured member the said helices in contacting relation; and adhering the said helices together at their contacting portions to form a unitary structure.

14. The method of forming a surgical cast or splint comprising providing a plurality of relatively small parallel threadedly interconnected helices of a plastic material having a multiplicity of contacting portions; applying about an injured member the said helices in contacting relation; and adhering the said helices together at their contacting portions to form a unitary structure.

15. The method of forming a surgical cast or splint comprising providing a plurality of relatively small parallel interfitted helices of a plastic material having a multiplicity of contacting portions, said helices being interconnected by longitudinally extending members formed of a plastic material; applying about an injured member the said helices in contacting relation; and adhering the said helices together at their contacting portions to form a unitary structure.

16. The method of forming a surgical cast or splint comprising providing a plurality of relatively small parallel interfitting helices of a plastic material having a multiplicity of contacting portions, said helices being interconnected by longitudinally extending helical members formed of a plastic material; applying about an injured member the said helices in contacting relation; and adhering the said helices together at their contacting portions to form a unitary structure.

17. The method of forming a surgical cast or splint comprising providing a plurality of relatively small parallel interconnected helices of a cellulose plastic material having a multiplicity of contacting portions; applying about an injured member the said helices in contacting relation; and adhering the said helices together at their contacting portions to form a unitary structure.

18. The method of forming a surgical cast or splint comprising the steps of applying about an injured member a plurality of relatively small interconnected helices of a plastic material having a minimum cross section of material of one-sixteenth of an inch; and adhering the said pieces together at their contacting portions to form a unitary structure.

19. The method of forming a surgical cast or splint comprising the steps of forming a pliable open mesh work structure of a plurality of relatively small readily cementable contacting loop containing members of plastic material; applying said structure about the body to be enclosed; and causing said members to adhere to each other at their contacting portions.

20. A surgical cast or splint material ready for application, comprising a plurality of relatively small parallel interconnected helices of a plastic material forming a strip and having a multiplicity of contacting portions, the convolutions of each helix being of oblong shape, whereby the contacting helices may be provided about an injured member with the helices contacting and there adhered to form a cast.

21. A surgical cast or splint comprising a plurality of relatively small parallel interconnected helices of a plastic material, the convolutions of each helix being of oblong shape, and said helices having a multiplicity of contacting portions and adhered together at their contacting portions thereby forming a unitary structure.

22. The method of forming a surgical cast or splint comprising providing a plurality of relatively small parallel interconnected helices of a plastic material having a multiplicity of contacting portions, the convolutions of each helix being of oblong shape; applying about an injured member the helices in contacting relation; and adhering the said helices together at their contacting portions to form a unitary structure.

23. A surgical cast or splint material ready for application, comprising a plurality of relatively small parallel interfitted helices of a plastic material forming a strip; and members of plastic material interconnecting, contacting and extending longitudinally of said interfitting helices, whereby the helices may be provided about an injured member with the helices and the longitudinally extending members contacting and there adhered to form a cast.

ROGER ANDERSON.

CERTIFICATE OF CORRECTION.

Patent No. 2,308,483. January 19, 1943.

ROGER ANDERSON.

It is hereby certified that error appears in the printed specification of the above numbered patent requiring correction as follows: Page 3, first column, line 42, strike out the word "give"; line 43, for "near" read --neat--; and second column, line 12, for "chisen" read --chisel--; page 7, second column, line 14, for "any" read --an--; line 16, for "as such" read --such as--; and that the said Letters Patent should be read with this correction therein that the same may conform to the record of the case in the Patent Office.

Signed and sealed this 11th day of May, A. D. 1943.

(Seal)

Henry Van Arsdale,
Acting Commissioner of Patents.